United States Patent
Stolk et al.

(10) Patent No.: US 7,458,238 B2
(45) Date of Patent: Dec. 2, 2008

(54) LOAD BINDER LOCKING DEVICE

(76) Inventors: Frank M. Stolk, 365 Valley Point North, Sherwood Park, Alberta (CA) T8A 4T7; Armando Cardamone, 3112-108 Avenue, Edmonton, Alberta (CA) T5W 084

( * ) Notice: Subject to any disclaimer, the term of this patent is extended or adjusted under 35 U.S.C. 154(b) by 196 days.

(21) Appl. No.: 11/457,383

(22) Filed: Jul. 13, 2006

(65) Prior Publication Data

US 2008/0040898 A1 Feb. 21, 2008

(51) Int. Cl.
*E05B 73/00* (2006.01)
(52) U.S. Cl. .................................. 70/18; 70/58; 24/298
(58) Field of Classification Search ........................ None
See application file for complete search history.

(56) References Cited

U.S. PATENT DOCUMENTS

| 4,693,097 A | 9/1987 | Rivera |
| 4,842,459 A * | 6/1989 | Jensen et al. ................... 410/97 |
| 5,775,673 A | 7/1998 | Carnes, Sr. et al. |
| 6,141,836 A | 11/2000 | Thornton |
| 6,477,747 B1 | 11/2002 | Flagg |

FOREIGN PATENT DOCUMENTS

CA 2157977 3/1997

* cited by examiner

*Primary Examiner*—Jack W. Lavinder
(74) *Attorney, Agent, or Firm*—Donald V. Tomkins

(57) ABSTRACT

A device for releasably locking a lever-type load binder in the closed or tightened position includes a length of cable or other suitable flexible material with a loop formed in one end. The cable passes through an opening in an abutment plate, such that the abutment plate can slide along the cable between a pair of spaced stop members fixed to the cable near its free end. When a lever-type load binder is engaged with a load-securing chain, the locking device may be used to lock the lever in the closed position by passing the loop end of the cable through a selected chain link adjacent to the lever, extending the free end of the cable around the load binder lever, and then passing the abutment plate and the tree end of the cable through the loop such that the loop is disposed behind the abutment plate, with the abutment plate preventing the loop from moving toward the free end of the cable. The locking device may be removed by angularly orienting the abutment plate so that it can be pushed back through the loop.

20 Claims, 3 Drawing Sheets

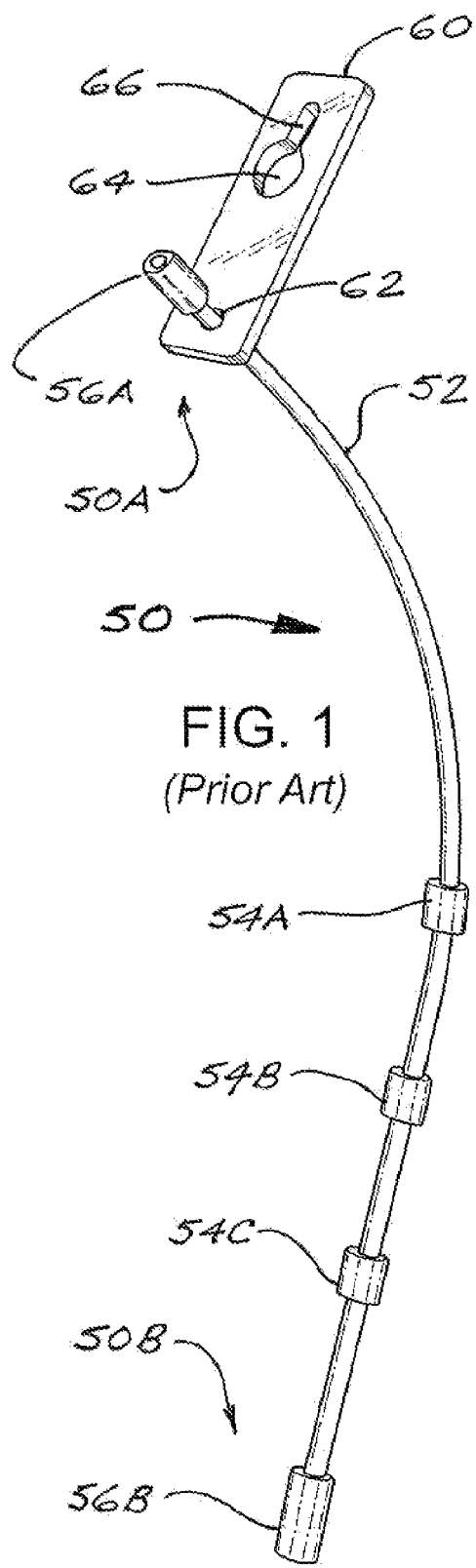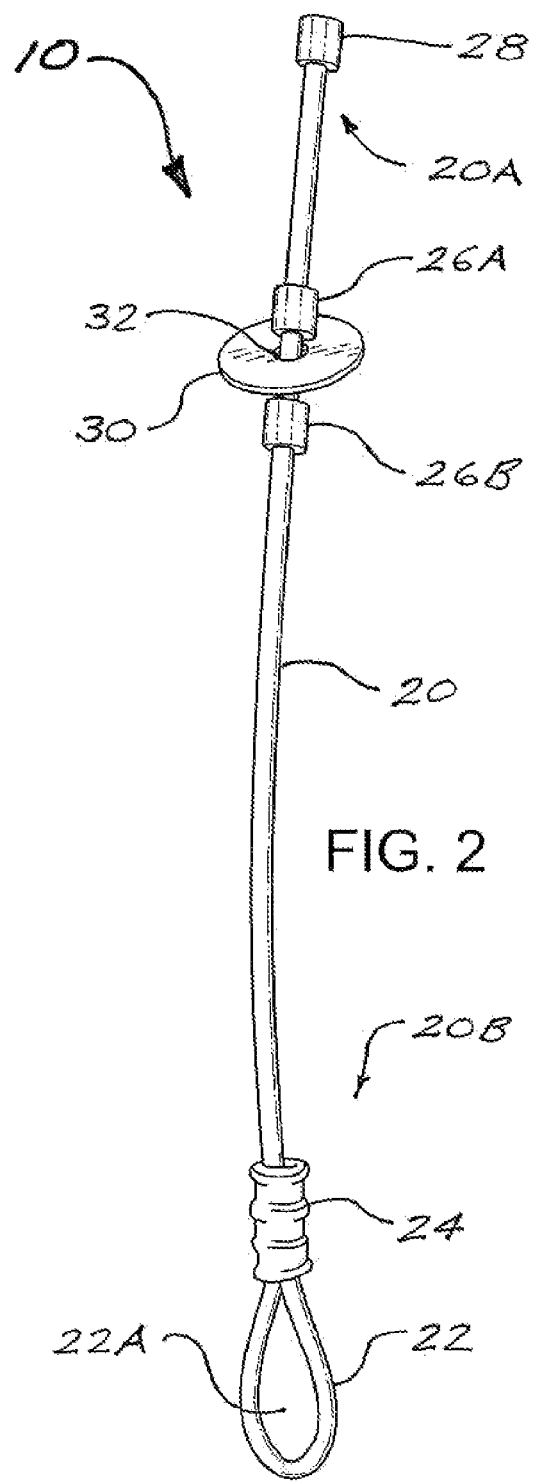

LOAD BINDER LOCKING DEVICE

FIELD OF THE INVENTION

The present invention relates in general to load binding apparatus for securing cargo loaded on transport vehicles, and in particular to devices for preventing premature or accidental disengagement of such apparatus.

BACKGROUND OF THE INVENTION

It is well known to use load binding apparatus of some type to secure loads on transport vehicles such as flatbed trailers and railcars, to prevent shifting of the loads during transit. In the field of road transport in particular, it is a common practice to secure bulky cargo such as palletized goods and large equipment on a flatbed trailer by running one or more heavy steel chains over the load and connecting each end of each chain to the trailer frame, typically be means of hooks attached to each chain end. The chains must have a certain amount of slack in order to be hooked to the frame, so they need to be cinched or tightened around the load in order to hold it in place.

This is typically done using what are known in the field as "load binders", of which there are numerous known types. Although their design and operation may differ to some extent, all load binders are similar in that they each have a pair of hooks that can be securely engaged with heavy chain (by slipping each hook over a selected chain link), plus a lever or other means which can be actuated to draw the load binder hooks toward each other. It is a relatively simple matter to engage the load binder hooks at appropriate locations on the chain so as to effectively shorten the length of the chain around the load (with any excess slack in the chain being gathered between the load binder hooks), such that actuation of the lever will further shorten the chain enough to induce tension in the chain so that the chain effectively clamps or binds the load against the flatbed.

The appropriate locations for engaging the load binder hooks with the chain will vary depending on the shape and configuration of the load being secured. If the hooks gather up too much chain slack, it will be impossible to actuate the lever; conversely, if they do not gather up enough slack, actuation of the lever will not induce any chain tension. Therefore, it may sometimes be necessary to determine the best hook engagement points by trial and error, but this is typically a quick and easy process. When the load binder is engaged with the chain in an optimal configuration, actuation of the lever in a first direction will tighten the chain securely around the load, and the lever will "snap" into a closed (i.e., tightened) position. In order to slacken the chain and remove it from the load, the load binder is released from the closed position by actuating the lever in the opposite direction, thereby lengthening the distance between the load binder hooks and relieving chain tension. The hooks can then be disengaged front the chain, and the chain can be removed from the load.

Unfortunately, load binder levers have been known to become inadvertently dislodged from the closed position, such as by accidental lever actuation, vibration during highway travel, or shock loading (such as when a trailer passes over a large bump or depression at excessive speed). These possibilities may be exacerbated by the fact that load binders tend to loosen somewhat once a loaded trailer starts traveling, as the secured load shifts slightly in response to travel-induced vibrations (and for this reason it is good trucking practice to check all load binders periodically during travel and adjust them as necessary). In any event, dislodgement of a load hinder lever can have serious consequences. If one or more levers are inadvertently released from the closed position, the chains will slacken, which in the worst case can result in the loads shifting or even tailing off the trailer during transit, creating major collision hazards for other traffic.

For the foregoing reasons, it is desirable and common to use supplemental means for preventing dislodgement of load binder levers from their closed positions. In fact, such supplement securement means may be required in order to comply with regulatory requirements. For example, the National Safety Code Standard 10 (Canada) and the Federal Motor Carrier Safety Administration (U.S.) both require that tiedowns (such as load binders) used to secure cargo on or to a vehicle must be attached and secured in a manner that prevents the tiedown from slipping, loosening, unfastening, opening, or releasing while the vehicle is in transit.

One known way to provide such secondary securement for a load binder is to run a length of haywire (i.e., malleable steel wire) through a selected chain link and around the load binder handle when it is in the closed position, and then to twist the ends of the haywire together using pliers. This crude method is commonly used, but it is not ideal. Haywire is comparatively soft and therefore vulnerable to damage and fracture, such as by inadvertent impact from tools or equipment. Installation of haywire is time-consuming, and removed pieces of haywire should or must be discarded. In addition, haywire is prone to rusting.

As discussed later in this specification, other known devices for providing secondary securement of load binders also have particular drawbacks and disadvantages.

For the foregoing reasons, there is a need for a device that provides reliable securement for load hinders and similar tiedowns, while at the same time being durable, inexpensive, and easy to install. There is a further need for such a device which is easily removable and which can be reliably re-used many times before requiring replacement. The present invention is directed to these needs.

BRIEF DESCRIPTION OF THE INVENTION

In general terms, the present invention is a reusable device for releasably locking a load binder in the closed position and in engagement with chains securing a load to a transport vehicle. The device is features a length of steel cable (or other suitable elongate flexible material) with one plain or free end and with a loop formed in the other end. The cable passes through an opening in an abutment plate (preferably in the form of a round metal disc similar to a washer), such that the abutment plate can slide along the cable between a pair of spaced stop members fixed to the cable near the free end thereof, one on either side of the abutment plate.

The range of sliding movement of the abutment plate is restricted by a pair of spaced stop members fixed to the cable near the free end thereof, one on either side of the abutment plate. The spacing of the stop members may be selected to suit specific applications, but typically will be fairly small (e.g., in the range of 0.5" to 1.0"). The stop members are large enough that then cannot pass through the opening in the abutment plate.

When a lever-type load binder is engaged with a load-securing chain, the locking device of the present invention may he used to lock the lever in the closed position by passing the loop end of the cable through a selected chain link adjacent to the lever;

extending the free end of the cable around the load binder lever; and passing the abutment plate and the free end of the cable through the loop such that the loop is disposed behind the abutment plate, with the abutment plate preventing the loop from moving toward the free end of the cable.

The device is easily removed from the load binder by angularly orienting the abutment plate relative to the cable so that it can be pushed back through the cable loop, thus allowing the device to be removed from the load binder and chain—and to be reused as desired.

Despite the ease with which the removal procedure can be carried out by the user, inadvertent or accidental removal due to impact, vibration, shock loading, or other phenomena is virtually impossible due to the fact that when the device is in place, the cable loop bears against abutment plate, which is dimensioned such that it cannot pass through the loop unless purposely re-oriented for that purpose.

Accordingly, in one aspect the present invention is a device for releasably locking a load binder in the closed position, said device comprising:
  (a) an elongate flexible member having a first end and a second end, with a closed loop being formed in the flexible member at said second end;
  (b) an abutment plate having an opening, said abutment plate being slidably retained on the flexible member in a selected region spaced away from the loop, with the flexible member passing through the opening in the abutment plate; and
  (c) first and second stop members fixed to the flexible member at a selected spacing, one on each side of the abutment plate, so as to limit the range of sliding movement of the abutment plate along the flexible member, said first stop member being positioned between the abutment plate and the first end of the flexible member, and said second stop member being positioned between the abutment plate and the second end of the flexible member;

wherein the loop and the abutment plate are configured such that the abutment plate, the first end of the flexible member, and the first stop member can be passed through the loop, allowing the loop to be positioned between the abutment plate and the second stop member.

BRIEF DESCRIPTION OF THE DRAWINGS

Embodiments of the invention will now be described with reference to the accompanying figures, in which numerical references denote like parts, and in which:

FIG. 1 illustrates a prior art load binder locking device, in its disengaged configuration.

FIG. 2 illustrates the load binder locking device of the present invention, in its disengaged configuration.

DETAILED DESCRIPTION OF THE PREFERRED EMBODIMENT

Figure 3:
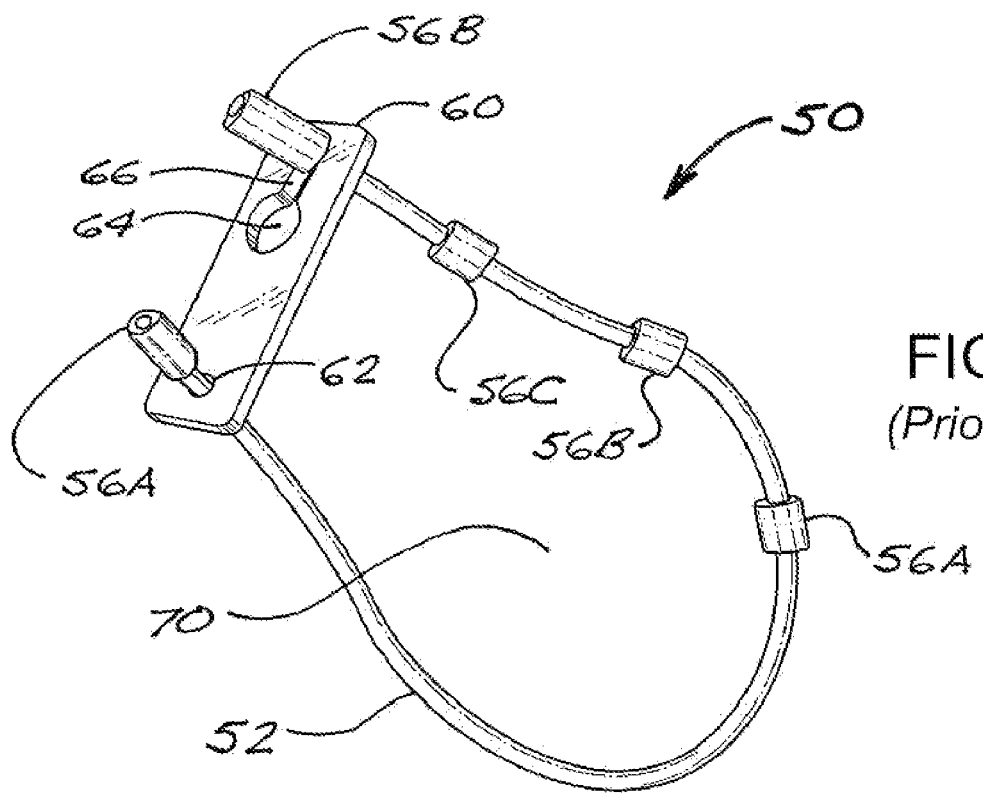
FIG. 3 illustrates the prior art locking device of FIG. 1, in its engaged configuration.

FIG. 1 illustrates a prior art load binder locking device 50, the main components of which are a length of cable 52 having a first end 50A and a second end 50B, and a retainer plate 60. Cable 52 passes through a first opening 62 in retainer plate 60 such that retainer plate 60 can slide along cable 52 within a region of cable 52 defined by a first end stop member 56A and a first intermediate stop member 54A as shown. The device also includes one or more additional intermediate stop members 54B and 34C, pins a second end stop member 56B at second end 50B of cable 52. Retainer plate 60 has a second opening 64 which is large enough to allow passage of second end stop member 56B as well as intermediate stop members 54A, 54B, and 54C. Retainer plate 60 also has a slot 66 contiguous with second opening 64 and oriented in the direction away from first opening 62, with slot 66 being wide enough to receive cable 52 but not wide enough to allow passage of second end stop member 56B, or intermediate stop members 54A, 54B, and 54C.

FIG. 3 illustrates how prior art device 50 may be manipulated to encircle an object (such as a closed load binder). The cable 52 is wrapped around the object (not shown), thus forming a loop 70 enclosing the object. Second end stop member 56B is then passed through second opening 64 of retainer plate 60 to tighten loop 70, as much as possible or desired, around the object being secured, while at the same time passing one or more of intermediate stop members 54C, 54B, and 54A, in that sequence, through second opening 64 if and as may be required. At this stage, cable 52 is moved laterally into slot 66, wherein it will tend to be maintained by the inherent tendency of the now-curved cable 52 to spring back to a straight configuration. Depending on which (if any) of intermediate stop members 54C, 54B, and 54A have been passed through retainer plate 60 during this tightening procedure, disengagement of cable 52 from retainer plate 60 (and, in turn, disengagement of device 50 from the object in question) will be inhibited by the fact that either second end stop member 56B or one of intermediate stop members 54A, 54B, and 54C will be abutting retainer plate 60 adjacent to slot 66, through which it is unable to pass.

While prior art device 50 can be effective, it is prone to inadvertent or accidental disengagement if cable 52 should be pushed or deflected toward second opening 64. This would allow the stop member abutting retainer plate 60 (i.e., end stop member 58 or one of the intermediate stop members 54A, 54B, and 54C) to pass through slot 66, thus causing the device 50 at best to become loosened and at worst to become completely disengaged from the object it previously secured.

Figure 4:
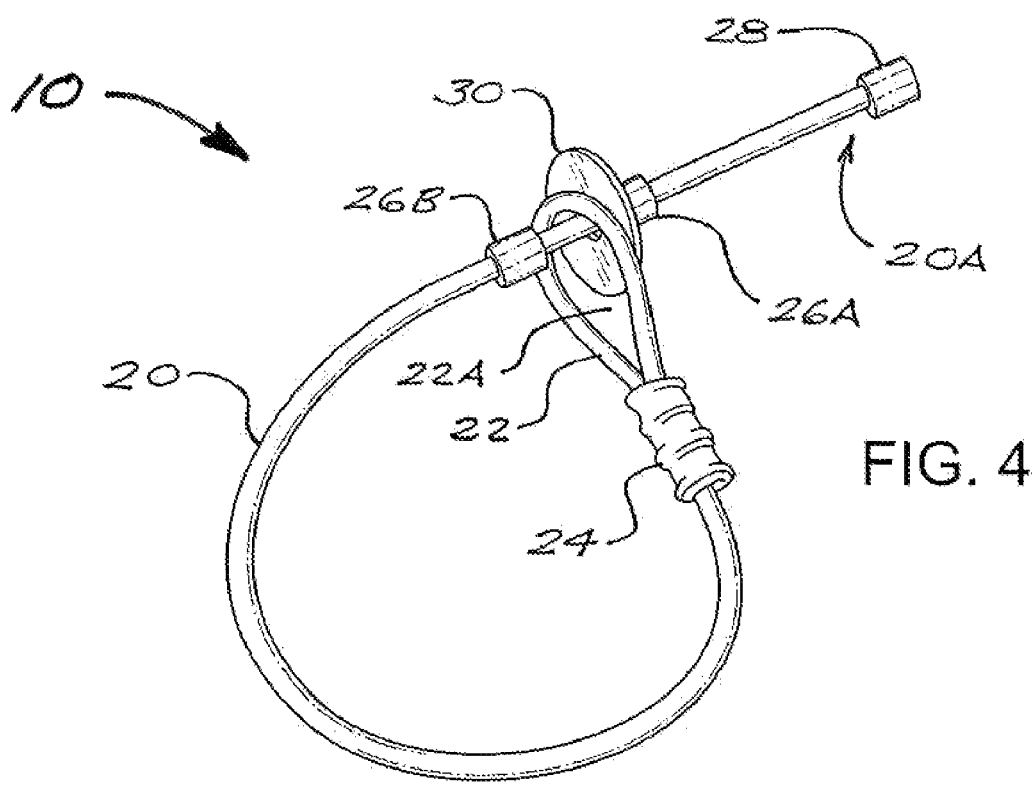
FIG. 4 illustrates the load binder locking device of FIG. 2, in its engaged configuration.

This problem is entirely eliminated in the present invention. As illustrated in FIGS. 2 and 4, the load binder locking device 10 of the present invention includes a flexible member 20 having a first end 20A and a second end 20B, with a loop 22 being formed in member 20 at second end 20B, and with loop 22 having a loop opening 22A. An abutment plate 30 with cable opening 32 is positioned in a selected region on flexible member 20 between a first stop member 26A and a second stop member 26B, which are fixedly connected to flexible member 20. The distance between first stop member 26A and second stop member 26B may be selected as desired, provided that it is sufficient permit angular deflection of abutment plate 30 relative to flexible member 20, to allow abutment plate 30 to be passed through loop opening 22A (as will be explained herein). Optionally (and by no means necessarily), a terminal stop member 28 may be fixed to first end 20A of flexible member 20 if desired. As shown in FIG. 4, first end 20A of flexible member 20 and abutment plate 30 may be passed through loop 22 such that loop is disposed between first stop member 26A and abutment plate 30. Abutment plate 30 thus prevents loop 22 from moving toward (and off) second end 20B of flexible member 20.

Figure 5:
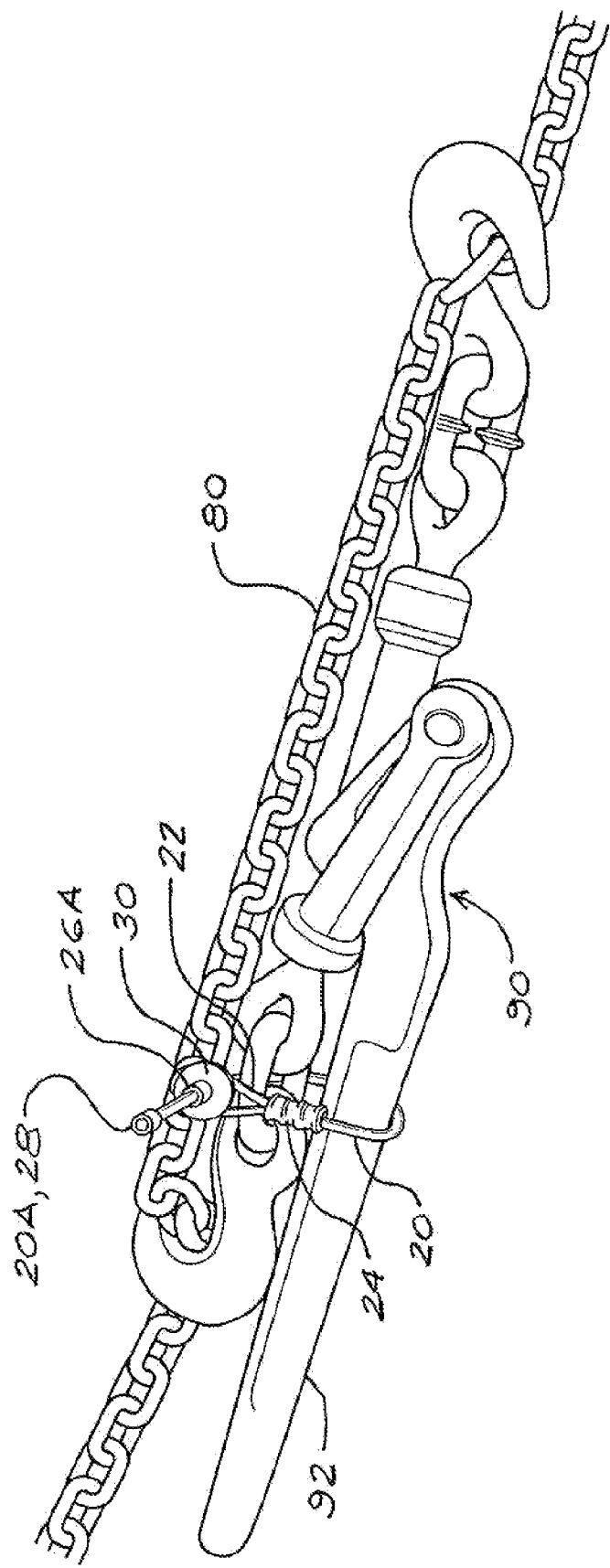
FIG. 5 illustrates the load binder locking device of the present invention, in its engaged configuration and mounted around the lever of a lever-type load binder in the closed position.

In a preferred method of use as shown in FIG. 5, locking device 10 may be used to lock a load binder 80 in the closed position by inserting loop 22 through a selected link of a load-securing chain 80 that has been tensioned with a load binder 90 having an actuating lever 92. With lever 92 in the closed (tensioned) position as shown in FIG. 5. flexible member 20 is then wrapped around lever 92 so that first end 20A of flexible member 20, first stop member 26A, and abutment plate 30 may be inserted through loop opening 22A. Loop 22 is then disposed between first stop member 26A and abutment plate 30, as most clearly seen in FIG. 4.

This procedure will typically entail angularly deflecting abutment plate 30 to a position generally as shown in FIG. 2 so that abutment plate 30 may be readily inserted through loop opening 22A. Preferably, angular deflection of abutment plate 30 will be facilitated by making cable opening 32 of abutment plate 30 a reasonable amount larger than the diameter of flexible member 20.

Installed as described above, the device 10 of the present invention securely locks handle 92 of load binder 90 in the closed position. Loop opening 22A is of sufficiently restricted size and configuration that it is virtually impossible for abutment plate 30 to pass back through loop opening 22A (thus releasing the device 10 from the load binder 90). In order for that to happen, a positive and deliberate effort must first be exerted to angularly deflect abutment plate 30 so as to align it with loop opening 22A, and this cannot happen as a result of mere accidental displacement of first end 20A of flexible member 20. Inadvertent disengagement of abutment plate 30 is made that much more unlikely (if not already impossible) by the latent elastic energy developed in flexible member 20 due to being wrapped or bent around handle 92, creating a tendency for flexible member 20 to rebound to a generally linear configuration (as in FIG. 2). This latent energy biases loop 22 against the face of abutment plate 30, thereby tending to orient abutment plate 30 transverse to the axis of flexible member 20, and also tending to dispose the outer end of loop 22 against flexible member 20 adjacent to abutment plate 30.

In the preferred embodiment of locking device 10, flexible member 20 is a twisted or braided cable, made of metal or other material suitable for the purpose. In a particularly preferred embodiment, flexible member 20 is a galvanized steel cable.

Loop 22 may be formed in any suitable fashion. For example, it may be formed by folding second end 20B of flexible member 20 against an inner portion of flexible member 20 and then fixing second end 20B thereto by any suitable means. Such means could take the form of a metallic sleeve 24 (preferably an aluminum sleeve) that is passed over the portions of flexible member 20 being joined, and then crimped to prevent relative movement.

Abutment plate 30 preferably will be in the form of a round or ovate aluminum disc. However, other materials could also be used, such as galvanized steel, stainless steel, or a plastic having suitable structural properties. As well, abutment plate 30 could take different geometric shapes without departing from the essence of the invention; for example, abutment plate 30 could be of rectilinear or polygonal configuration.

Stop members 26A, 26B, and 28 may be formed by crimping metal sleeves (preferably aluminum sleeves) over flexible member 20 in desired locations.

It will be readily appreciated by those skilled in the art that various modifications of the present invention may be devised without departing from the essential concept of the invention, and all such modifications are intended to come within the scope of the appended claims. To provide one particular (and non-limiting) example, locking device 10 could include one or more additional abutment plates 30, with corresponding additional stop members, in order to facilitate use in conjunction with chains and load binders of different sizes. Such alternative embodiments with two or more abutment plates 30 would also provide double security against inadvertent opening of load binders, although that should not be necessary so long as the components of locking device 10 remain in sound physical condition.

Although the present invention has been described in the context of its use for releasably locking a load binder, it will also be appreciated that the utility of the invention is in no way restricted or limited to use in association with load binders. Persons skilled in the art will readily understand that the invention may be used or adapted for releasable locking or securement of many different types of objects in many different practical applications.

In this patent document, the word "comprising" is used in its non-hunting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A locking device for releasably securing an object, said device comprising:
   (a) an elongate flexible member having a first end and a second end, with a closed loop being formed in the flexible member at said second end by folding the second end of the flexible member against an inner portion of the flexible member, and fixing said second end thereto;
   (b) an abutment plate having an opening, said abutment plate being slidably retained on the flexible member in a selected region spaced away from the loop, with the flexible member passing through the opening in the abutment plate; and
   (c) first and second stop members fixed to the flexible member at a selected spacing, one on each side of the abutment plate, so as to limit the range of sliding movement of the abutment plate along the flexible member, said first stop member being positioned between the abutment plate and the first end of the flexible member, and said second stop member being positioned between the abutment plate and the second end of the flexible member;

wherein the loop and the abutment plate are configured such that the abutment plate, the first end of the flexible member, and the first stop member can be passed through the loop, allowing the loop to be positioned between the abutment plate and the second stop member.

2. The locking device of claim 1 wherein the flexible member is a twisted cable.

3. The locking device of claim 2 wherein the cable is a galvanized steel cable.

4. The locking device of claim 1 wherein the second end of the flexible member is fixed to the inner portion of the flexible member by means of a crimped metal sleeve.

5. The locking device of claim 1 wherein the abutment plate is a round disc.

6. The locking device of claim 1 wherein the abutment plate is a rectilinear plate.

7. The locking device of claim 1 wherein the abutment plate is of ovate shape.

8. The locking device of claim 1 wherein the abutment plate is a polygonal plate having at least four sides.

9. The locking device of claim 1 wherein each of the stop members is a sleeve extending around the flexible member and crimped thereto.

10. The locking device of claim 9 wherein the sleeve is made from a metal.

11. The locking device of claim 10 wherein the metal is aluminum.

12. A locking device for releasably securing an object, said device comprising:
   (a) an elongate flexible member having a first end and a second end, with a closed loop being formed in the flexible member at said second end;
   (b) an abutment plate having an opening, said abutment plate being slidably retained on the flexible member in a selected region spaced away from the loop, with the flexible member passing through the opening in the abutment plate;
   (c) first and second stop members fixed to the flexible member at a selected spacing, one on each side of the abutment plate, so as to limit the range of sliding movement of the abutment plate along the flexible member, said first stop member being positioned between the abutment plate and the first end of the flexible member, and said second stop member being positioned between the abutment plate and the second end of the flexible member; and
   (d) a terminal stop member at the first end of the flexible member;

wherein the loop and the abutment plate are configured such that the abutment plate, the first end of the flexible member, and the first stop member can be passed through the loop, allowing the loop to be positioned between the abutment plate and the second stop member.

13. The locking device of claim 12 wherein the terminal stop member is a sleeve extending around the flexible member and crimped thereto.

14. The locking device of claim 13 wherein the sleeve of the terminal stop member is made from a metal.

15. The locking device of claim 14 wherein the metal is aluminum.

16. The locking device of claim 12 wherein the flexible member is a twisted cable.

17. The locking device of claim 12 wherein the loop is formed by folding the second end of the flexible member against an inner portion of the flexible member, and fixing said second end thereto.

18. The locking device, of claim 12 wherein each of the first and second stop members is a sleeve extending around the flexible member and crimped thereto.

19. The locking device of claim 18 wherein the sleeve of each of the first and second stop members is made from a metal.

20. The locking device of claim 19 wherein the metal is aluminum.

\* \* \* \* \*